United States Patent [19]
Iino et al.

[11] Patent Number: 5,261,349
[45] Date of Patent: Nov. 16, 1993

[54] INDICATOR DEVICE FOR VEHICLE

[75] Inventors: Tadashi Iino; Kunimitsu Aoki, both of Shizuoka, Japan

[73] Assignee: Yazaki Corporation, Tokyo, Japan

[21] Appl. No.: 846,080

[22] Filed: Mar. 5, 1992

[30] Foreign Application Priority Data

Mar. 28, 1991 [JP] Japan ................... 3-064653

[51] Int. Cl.$^5$ ............................................. G01D 11/28
[52] U.S. Cl. ................... 116/286; 359/438; 116/DIG. 36; 362/29
[58] Field of Search ............... 116/310, 286, 287, 288, 116/DIG. 35, DIG. 36, 62.1; 359/436, 438, 440, 441, 442; 362/23, 26, 27, 28, 29, 30; 73/866.3

[56] References Cited

U.S. PATENT DOCUMENTS

| | | | |
|---|---|---|---|
| 2,671,163 | 3/1954 | Minter | 116/286 |
| 2,673,288 | 3/1954 | Stevens et al. | 116/DIG. 36 |
| 2,761,056 | 8/1956 | Lazo | 116/DIG. 36 |
| 3,246,133 | 4/1966 | Hensleigh | . |
| 3,349,234 | 10/1967 | Scharz | 116/287 |
| 3,561,145 | 2/1971 | Showell | 362/26 |
| 3,853,088 | 12/1974 | Marko | 116/286 |
| 4,004,546 | 1/1977 | Harland | 116/288 |
| 4,258,643 | 3/1981 | Ishikama et al. | 116/DIG. 36 |
| 4,737,896 | 4/1988 | Mochizuki et al. | 362/23 |
| 4,872,415 | 10/1989 | Nakadozono et al. | . |
| 4,874,224 | 10/1989 | Guman et al. | 362/29 |
| 4,986,631 | 1/1991 | Aoki et al. | 359/438 |

FOREIGN PATENT DOCUMENTS

| | | |
|---|---|---|
| 827715 | 12/1951 | Fed. Rep. of Germany . |
| 889069 | 12/1943 | France . |
| 214644 | 5/1941 | Switzerland . |

*Primary Examiner*—Thomas B. Will
*Attorney, Agent, or Firm*—Sughrue, Mion, Zinn, Macpeak & Seas

[57] ABSTRACT

A prism-type pointer is provided adjacent to a front face of a prism-type dial plate in such a manner that their prism apex angles are directed in opposite directions, respectively. Those portions of the dial plate having characters/scale markings or the like are recessed, and a light source is provided at a back side of the dial plate. A pointer drive portion is provided on a bottom surface of the dial plate so as to effect a parallel movement of the pointer. Light of the light source, passed through both of the dial plate and the pointer can reach a driver's eye point, and light, passed only through the dial plate, can not reach the driver's eye point, except for those portions thereof having the characters/scale markings or the like.

6 Claims, 6 Drawing Sheets

INDICATOR DEVICE FOR VEHICLE

BACKGROUND OF THE INVENTION

This invention relates to an indicator device for a vehicle in which characters, a scale, a pointer etc., are brightened by back light, and more particularly to a vehicle indicator device of the analog meter-type in which only characters, a scale etc., of a dial plate, as well as a pointer, are brightened utilizing critical angles of prisms.

Usually, in the daytime, a speedometer or the like of the analog meter-type used as a vehicle indicator device does not especially need illumination since it can be visually recognized thanks to the external light; however, in the night or in a tunnel, the device requires illumination since the outside is dark. Therefore, there is a conventional device as shown in FIG. 12 in which characters, a scale, a pointer and etc., are brightened by back light, also there is a conventional device of the reflection type as shown in FIG. 13.

In the device shown in FIG. 12, a light guide plate 43 is provided between an interior device 41 for driving a pointer 45 and a dial plate 42, and light from light source bulbs 44 is introduced into the light guide plate 43 from its ends 43a as indicated by arrows in the drawings, so that the light guide plate 43 is brightened at the back side of the dial plate 42, thereby brightening a light-transmitting scale etc., formed on the dial plate 42. With respect to the pointer 45, the light is applied from the light guide plate 43 to a boss 45a of the pointer 45 along the outer periphery of a pointer shaft 41a, so that the pointer 45 is brightened by the guidance and diffusion of the light within the pointer 45.

In the vehicle indicator device shown in FIG. 13, a light source bulb 54 is provided at the front upper side of a dial plate 52 and a pointer 55, and light is applied to the dial plate 52 and the pointer 55, and is reflected. Reference numeral 51 denotes a drive portion for the pointer 55.

However, when a vehicle, using the vehicle indicator device of the above illumination type, suddenly enters the dark, such as a tunnel, during the travel in the daytime, the degree of expansion of the irises of the eyes of the driver can not follow this change, and therefore before the eyes become adapted to it, the indication of the meter appears dark, and lacks in visibility. Further, when light, for example, of a headlamp is applied from a position in front of the vehicle, the irises of the driver's eyes become narrow, so that the meter appears dark, thus adversely affecting the visibility.

In such a case, the visibility can be enhanced by increasing the contrast and brightness of the meter; however, in the above conventional vehicle indicator devices, it is difficult to increase the brightness of the bulb to a level higher than the present level because of heat radiation and so on.

SUMMARY OF THE INVENTION

It is an object of this invention to provide an analog meter-type indicator device for a vehicle which can provide high contrast and high brightness to provide a high visibility even when the ambient brightness is suddenly changed.

According to the present invention, there is provided an indicator device for a vehicle comprising a dial plate; a pointer provided at a front side of said dial plate; a light source provided on a back side of said dial plate so as to brighten said pointer and characters/scale markings of said dial plate; and drive means for driving said pointer, wherein each of said dial plate and said pointer is constituted by a prism; prism apex angles of opposed portions of said dial plate and said pointer are directed in opposite directions, respectively; those portions of said dial plate having said characters/scale markings are recessed; light of said light source, passed through both of said dial plate and said pointer can reach a driver's eye point; and light, passed only through said dial plate, can not reach the driver's eye point, except for those portions thereof having said characters/scale markings.

In the above construction, when the light source is turned on, light emitted from the light source is incident on the dial plate constituted by the prism. The light incident on the back face of the dial plate advances to the front face of the dial plate, and goes out from the front face, and at this time the direction of the optical axis of the outgoing light passed only through the dial plate is different from the direction of the optical axis of the outgoing light passed through both of the dial plate and the pointer. The light, passed only through the dial plate, is influenced by the critical angle of the prism, and can not be directed toward the driver's eye point. Therefore, when viewed from the driver's eye point, the light of the light source provided at the back side of the dial plate can not be viewed, and the dial plate in a non-brightened condition is visually recognized.

On the other hand, the light, passed through both of the dial plate and the pointer, goes out from the pointer without being influenced by the critical angle of the prism, and reaches the driver's eye point. Therefore, when viewed from the driver's eye point, the brightened pointer at the front side of the non-brightened dial plate can be visually recognized. Those portions of the dial plate having the characters/scale markings are recessed so as not to cause the prism effect, and therefore when viewed from the driver's eye point, the light of the light source provided at the back side of the dial plate can be viewed through those portions having the characters/scale markings, and as a result those portions having the characters/scale markings are brightened, and can be visually recognized.

DETAILED DESCRIPTION OF THE PREFERRED EMBODIMENTS

Preferred embodiments of the present invention will now be described with reference to the drawings.

Figure 1:
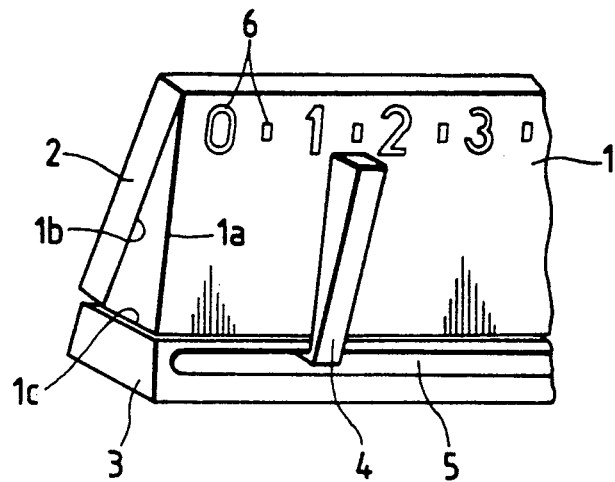
FIG. 1 is a perspective view of a first embodiment of a vehicle indicator device of the present invention.
Figure 2:
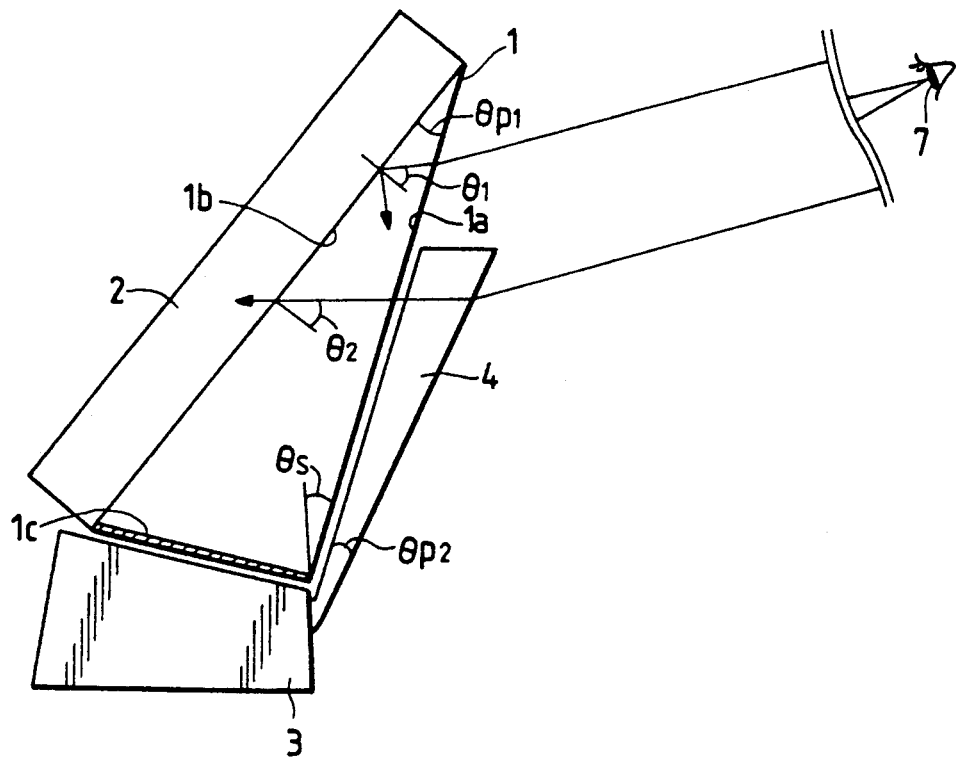
FIG. 2 is a side-elevational view of the vehicle indicator device of FIG. 1.

As shown in FIG. 1, one preferred embodiment of a vehicle indicator device of the present invention includes a dial plate 1 constituted by a prism of a triangular cross-section. A light source 2 is provided adjacent to a back face 1b of the dial plate 1. A fluorescent lamp (not shown) is mounted within the light source 2, and a light diffusion plate (not shown) for causing the light source 2 to uniformly illuminate the entire surface is provided between the fluorescent lamp and the dial plate 1.

A pointer drive portion 3 is mounted on a bottom surface 1c of the dial plate 1, and an elongate opening 5 is formed in the front surface of the pointer drive portion 3. A pointer 4, constituted by a prism, is mounted on the pointer drive portion 3 through the opening 5. The pointer 4 is disposed close to a front face 1a of the dial plate 1. When a signal is inputted to the pointer drive portion 3, the pointer 4 slides along the opening 5 in response to this signal so as to indicate a corresponding character/scale marking 6. A dark-color coating is formed on the above bottom surface 1c.

With respect to the positional relation between the dial plate 1 and the pointer 4, the two are disposed adjacent to each other in such a manner that the prism apex angle $\theta_{p1}$ of the dial plate 1 and the prism apex angle $\theta_{p2}$ of the pointer 4 are directed in opposite directions, respectively. The front face 1a of the dial plate 1 is inclined toward the eye point at an angle of $\theta$, with respect to a vertical plane. The values of the prism apex angle $\theta_{p1}$ and the inclination angle $\theta_s$ of the dial plate 1 are determined based on the following conditions.

Here, assuming that light is emitted from the driver's eye point 7, this light is incident on the front face 1a of the dial plate 1, and passes through the dial plate 1, and is incident on the back face 1b of the dial plate 1. At this time, if the angle of incidence of the light on the back face 1b is not less than a critical angle, this light is subjected to total reflection, and can not pass through the back face 1b of the dial plate 1. Namely, if the values of the prism apex angle $\theta_{p1}$ and the inclination angle $\theta_s$ of the dial plate 1 are so determined as to achieve this condition, the light of the light source 2 can not be viewed through the dial plate, when viewed from the driver's eye point 7, and only the dark color of the bottom surface 1c of the dial plate 1 can be visually recognized.

On the other hand, the prism apex angle $\theta_{p2}$ of the prism-type pointer 4 is directed in the direction opposite to the direction of the prism apex angle $\theta_{p1}$ of the dial plate 1. Assuming that light is emitted from the driver's eye point 7, this light passes through the pointer 4, and is incident on the front face 1a of the dial plate 1, and further is incident on the back face 1b of the dial plate 1. The value of the apex angle $\theta_{p2}$ is so determined that the angle $\theta_2$ of incidence of the light on the back face 1b at this time is not more than a critical angle. By doing so, the light of the light source 2 can be viewed through the pointer 4 and the dial plate 1 from the driver's eye point 7, and the pointer 4 brightened against the background of the dark-color dial plate 1 can be visually recognized.

Figure 3:
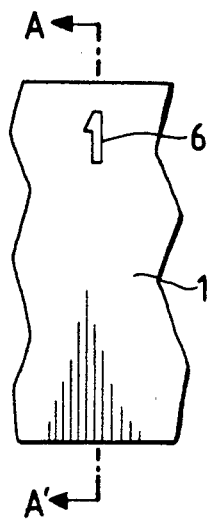
FIG. 3(a) is a front-elevational view showing that portion of a dial plate having a character/scale marking.
FIG. 3(b) is a cross-sectional view taken along the line A—A'.
Figure 3:
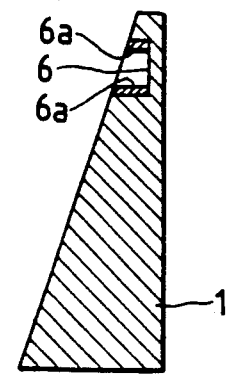

With respect to the characters/scale markings 6 of the dial plate 1, those portions having the characters/scale markings 6 are recessed as shown in FIGS. 3(a) and 3(b), and the front and back surfaces of each of these portions, that is, the front face 1a and the back face 1b of the dial plate 1, are parallel to each other. Further, a coating is formed on upper, lower, right and left side walls 6a of this recessed portion.

Therefore, when the light emitted from the light source 2 passes through the characters/scale markings 6, this light is not subject to a prism effect, and hence reaches the driver's eye point 7 in an almost intact manner, so that the characters/scale markings 6 in the brightened condition can be visually recognized from the eye point 7. At time, since the coating is formed on the upper, lower, right and left side walls 6a of the character/scale marking 6, the light is not reflected by these side walls 6a, and therefore it can be easily recognized visually.

Figure 4:
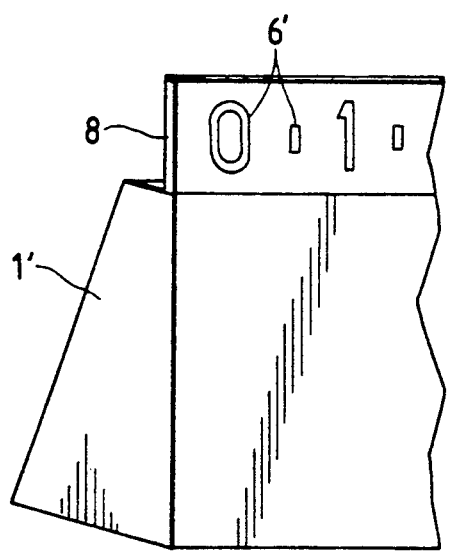
FIG. 4 is a view showing a modified configuration of that portion of the dial plate having characters/scale markings.

Alternatively, as shown in FIG. 4, an upper portion of a dial plate 1' is formed by a flat plate 8, and those portions of this flat plate on which characters/scale markings 6 are formed are transparent, and a coating which does not allow light to pass therethrough is formed on the remainder. In this case, also, similar effects can be obtained.

As described above, utilizing the critical angles of the prisms, the pointer 4 and the characters/scale markings 6 are brightened against the dark background, and therefore there can be obtained the vehicle indicator device having a high contrast achieving good visibility and recognizability. In this case, most factors in the reduction of the amount of the light from the light source 2 are based only on the light permeability of the prisms, and therefore the reduction of the light amount is less, so that the indication of high brightness can be obtained, and the lowering of the visual recognition of the indicator device due to a sudden change in the external light can be dealt with.

Figure 5:
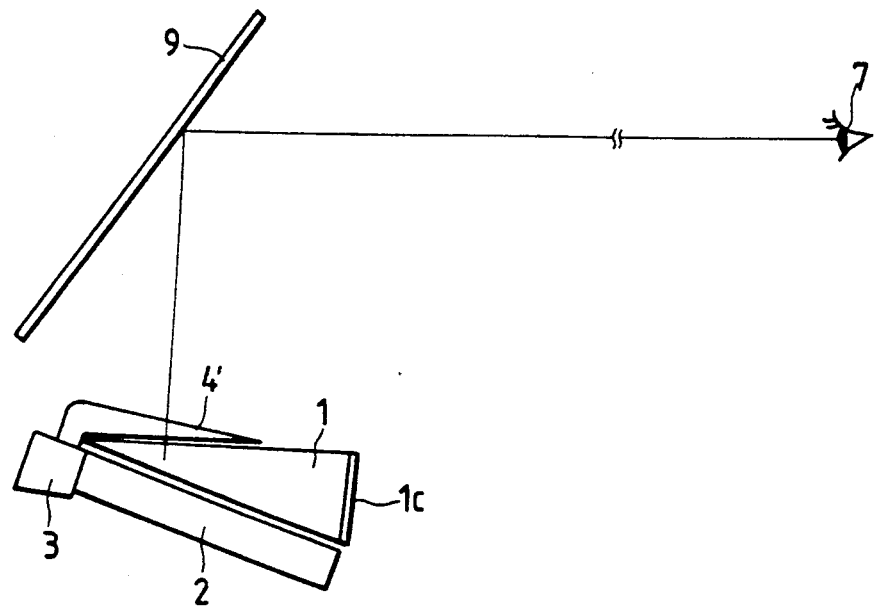
FIG. 5 is a view showing an example in which a vehicle indicator device of this embodiment is used as a device for a virtual image indicator device.

Incidentally, since the high-brightness indication can be made, the above construction can be used as a device for a virtual image indicator device, using a reflection plate 9, as shown in FIG. 5. In this Figure, the position of mounting of a drive portion 3 is different from that shown in FIG. 1, and therefore the manner of mounting of a pointer 4' on the drive portion 3 is different.

Next, a second embodiment will now be described.

Figure 6A:
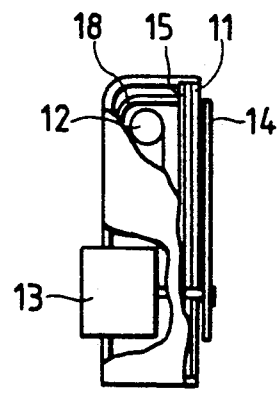
FIG. 6(a) is a side-elevational view of a second embodiment of a vehicle indicator device of the invention.
Figure 6B:
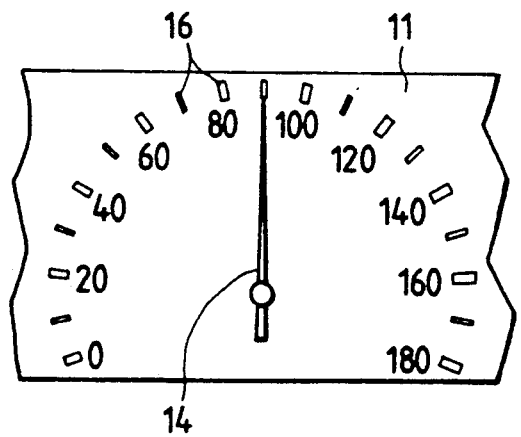
FIG. 6(b) is a front-elevational view thereof.

As shown in FIGS. 6(a) and 6(b), parts of a vehicle indicator device of this embodiment are arranged in the same manner as in an ordinary vehicle indicator device. A pointer 14 is provided close to a front face of a dial plate 11, and a light source 12 is mounted on a back face of the dial plate 11 through a diffusion plate 15. A reflection plate 18 is mounted outwardly of the light source 12. A drive portion 13 is connected to a pointer shaft of the pointer 14, and when a signal is inputted to the drive portion 13, the drive portion 13 is operated to angularly move the pointer 14 to a position corresponding to this signal, so that the pointer indicates a corresponding character/scale marking 16.

Figure 7:
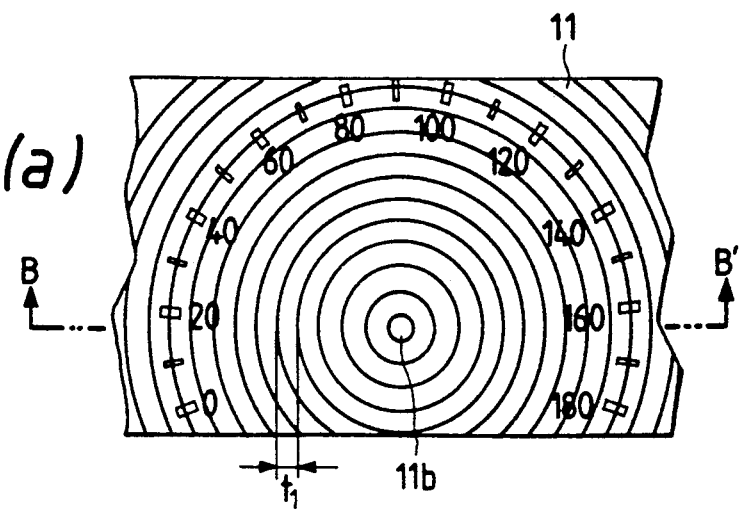
FIG. 7(a) is a front-elevational view of a dial plate used in the second embodiment.
FIG. 7(b) is a view taken along the line B—B'.
Figure 7:
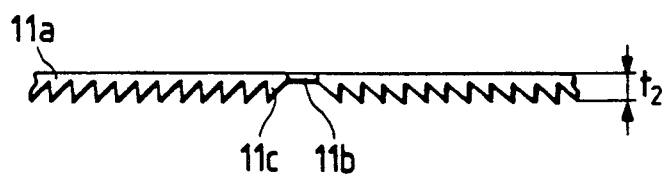
Figure 8:
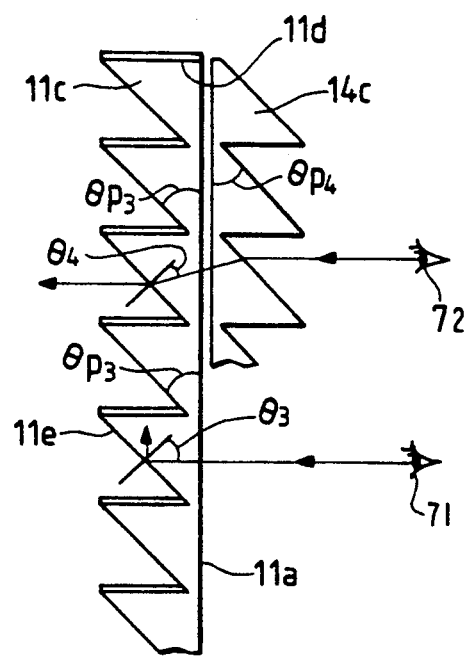
FIG. 8 is a view showing the arrangement of a dial plate and a pointer, as well as the transmission of light.

In this embodiment, the dial plate 11 is made of a transparent member, and as shown in FIGS. 7(a) and 7(b), its front face 11a is flat, but prisms 11c of a serrated cross-section are formed on its back face, and are spaced at predetermined intervals $t_1$ in a concentric manner about its central portion 11b through which the pointer shaft of the pointer 14 is passed. The pointer 14, disposed close to the front face of the dial plate 11, also has prisms 14c of a serrated cross-section spaced at predetermined intervals $t_1$ over an area extending from the portion thereof (to which the pointer shaft is connected) to its distal end, as in the dial plate 11. As shown in FIG. 8, the prism apex angles $\theta_{p3}$ and $\theta_{p4}$ of the opposed prisms 11c and 14c are directed in opposite directions, respectively, and a dark-color coating is formed on a bottom surface 11d of the prism 11c. Incidentally, by narrowing the interval $t_1$, the thickness $t_2$ of the dial plate 11 as well as the thickness $t_3$ of the pointer 14 can be reduced.

With respect to the conditions of determining the value of the prism apex angle $\theta_{p3}$ of the dial plate 11, assuming that light is emitted from a driver's eye point 71, this light is incident on the front face 11a of the dial plate 11, and further is incident on an inclined surface 11e of the prism 11c formed on the back face of the dial plate 11. At this time, if the angle $\theta_3$ of incidence of the light on the inclined surface 11e is not less than a critical angle, this light is subjected to total reflection, and can not pass through the back face of the dial plate 11. Namely, if the value of the prism apex angle $\theta_{p3}$ of the dial plate 11 is so determined as to achieve this condition, the light of the light source 12 can not be viewed through the dial plate 11, when viewed from the driver's eye point 71, and only the dark color of the bottom surface 11d of the prism 11c of the dial plate 11 can be visually recognized.

On the other hand, with respect to the apex angle $\theta_{p4}$ of the prism 14c formed on the pointer 14, assuming that light is emitted from the driver's eye point 72, this light passes through the prism 14c, and is incident on the front face 11a of the dial plate 11, and further is incident on the prism 11c formed on the back face of the dial plate 11. The value of the apex angle $\theta_{p4}$ is so determined that the angle $\theta_4$ of incidence of the light on the prism 11c at this time is not more than a critical angle. By doing so, the light of the light source 12 can be viewed through the pointer 14 and the dial plate 11 from the driver's eye point 72, and the pointer 14 brightened against the background of the dark-color dial plate 11 can be visually recognized.

Figure 9:
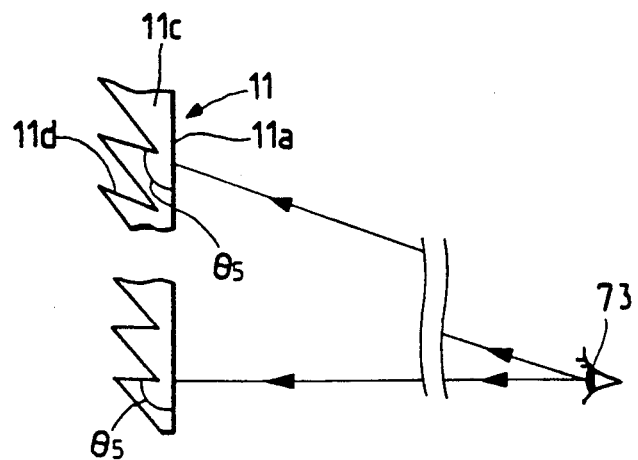
FIG. 9 is a view showing the inclination of bottom surfaces of prisms of the dial plate with respect to the front face of the dial plate.

As shown in FIG. 9, the angle $\theta_5$ between the front face 11a of the dial plate 11 and the bottom surface 11d of the prism 11c at the central portion of the driver's eye point 7 is different from that at the end portion of the driver's eye point 73. The reason is that by adjusting the inclination of the bottom surface 11d, the permeating light from the light source 12 can be efficiently recognized by the driver, without being intercepted by the bottom surfaces 11d, over the area from the central portion to the end portion of the dial plate 11.

Figure 10:
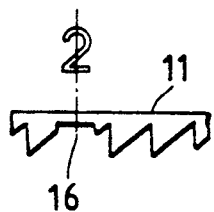
FIG. 10 is a view showing the configuration of that portion of the dial plate having characters/scale markings.
Figure 11:
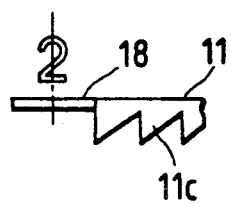
FIG. 11 is a view showing a modified configuration of that portion of the dial plate having characters/scale markings.
Figure 12:
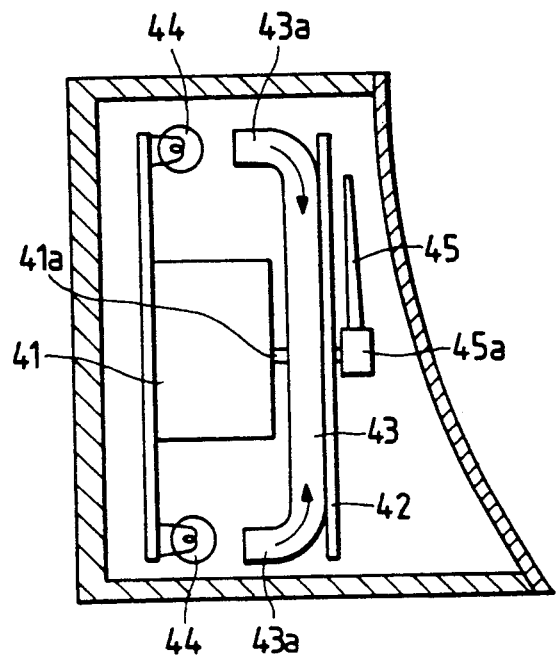
FIG. 12 is a side-elevational view of a conventional vehicle indicator device.
Figure 13:
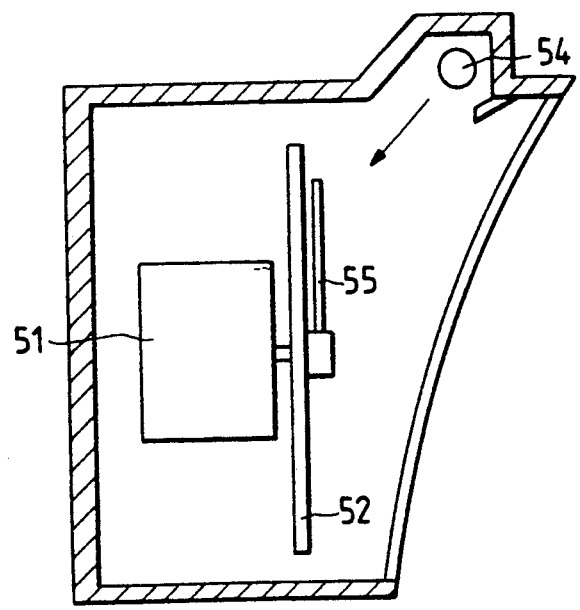
FIG. 13 is a side-elevational view of another conventional vehicle indicator device.

As in the first embodiment, those portions of the dial plate 11 having the characters/scale markings 16 are recessed in such a manner that the front face 11a and the back face of the dial plate 11 are parallel to each other, as shown in FIG. 10. Alternatively, as shown in FIG. 11, that portion having the characters/scale markings 16 is formed by a flat plate 18, and the characters 16 and etc., are transparent, and a coating is formed on the remainder.

The vehicle indicator device of this embodiment also has effects similar to those of the first embodiment, and since the high-brightness indication can be made, this construction can be used as a device for a virtual image indicator device, using a reflection plate, as described above for FIG. 5. Further, if this construction is mounted on a dashboard of the vehicle, it can be suitably used utilizing the external light, even with the light source omitted.

As described above, in the present invention, each of the dial plate and the pointer is constituted by the prism, and the prism apex angles of the opposed portions of the dial plate and the pointer are directed in opposite directions, respectively, and those portions of the dial plate having the characters/scale markings and etc., are recessed, and the light of the light source, passed through both of the dial plate and the pointer can reach the driver's eye point, and the light, passed only through the dial plate, can not reach the driver's eye point, except for those portions thereof having the characters/scale markings and etc. Therefore, the light source can not be viewed through the dial plate from the driver's eye point, except for those portions having the characters/scale markings, and the light source can be viewed through that portion where the pointer and the dial plate overlap each other. Therefore, the characters/scale markings can be visually recognized in a brightened manner against the background of the dark color.

Further, since most factors in the reduction of the amount of light from the light source are based only on the light permeability due to the material of the prism, the reduction of the light amount is less, and the high-brightness indication can be made, and the lowering of the visual recognition due to a sudden change in the external light can be dealt with.

What is claimed is:

1. An indicator device to be viewed by a viewer from a predetermined viewing point, comprising:
   a dial plate prism having recessed portions corresponding to indicia thereon;
   a light for illuminating a back side of said dial plate;
   a pointer prism, said pointer prism being proximate a front side of said dial plate, opposite said back side; and
   drive means for moving said pointer prism with respect to said dial plate,
   wherein said dial plate prism and said pointer prism are oriented with respect to each other such that apex angles thereof are directed in opposite directions, facing each other, and with respect to said viewing point such that a light emitted from said viewing point and passing through both of said dial plate and said pointer prisms is incident on the back side of the dial plate prism at an angle less than a critical angle whereat said light would be internally reflected in said dial plate prism, and wherein a surface of said dial plate prism opposite said apex angle is dark.

2. A indicator device as claimed in claim 1, wherein said light passes through said recess portion to said front side of said dial plate.

3. An indicator device as claimed in claim 1, wherein light which passes only through said dial plate prism is incident on the back side of the dial plate prism at an angle greater than said critical angle so as to be internally reflected in said dial plate prism.

4. A indicator device as claimed in claim 1, wherein said prism of said dial plate prism has a triangular cross section.

5. A indicator device as claimed in claim 1, wherein said pointer prism has a triangular cross section.

6. An indicator device to be viewed by a viewer from a predetermined viewing point, comprising:
- a dial plate including a plurality of first serrated prisms disposed on a back face thereof and spaced at a predetermined interval in a concentric manner about a center point, said dial plate having recessed portions corresponding to indicia thereon;
- a light for illuminating a back side of said dial plate;
- a pointer disposed proximate a front side of said dial plate, opposite said back side, said pointer including a plurality of second serrated prisms on a side thereof spaced at said predetermined interval and respectively opposing said first prisms; and
- drive means for rotating said pointer with respect to said dial plate about said center point, wherein said plurality of first and second prisms are oriented with respect to each other such that apex angles of said first serrated prisms are respectively directed in opposite directions from apex angles of said second serrated prisms, and with respect to said viewing point such that light emitted from said viewing point and passing through both said first and second prisms is incident on the back side of at least one of said second serrated prisms at an angles less than a critical angle whereat said a light would be internally reflected in said dial plate, and wherein each of said second prisms include a dark coating on a surface thereof opposing said apex angle.

* * * * *